United States Patent
Haller et al.

(10) Patent No.: US 7,103,886 B2
(45) Date of Patent: Sep. 5, 2006

(54) SYSTEM, METHOD, COMPUTER PROGRAM PRODUCT FOR COMMUNICATING DATA FOR OBJECTS THAT ARE TRANSPORTED FROM FIRST LOCATION TO SECOND LOCATION

(75) Inventors: Stephan Haller, Karlsruhe (DE); Richard Swan, Portola Valley, CA (US)

(73) Assignee: SAP AG, Walldorf (DE)

( * ) Notice: Subject to any disclaimer, the term of this patent is extended or adjusted under 35 U.S.C. 154(b) by 713 days.

(21) Appl. No.: 10/182,446

(22) PCT Filed: Oct. 19, 2001

(86) PCT No.: PCT/EP01/12111

§ 371 (c)(1),
(2), (4) Date: Oct. 30, 2002

(87) PCT Pub. No.: WO02/47014

PCT Pub. Date: Jun. 13, 2002

(65) Prior Publication Data

US 2003/0141985 A1    Jul. 31, 2003

Related U.S. Application Data

(60) Provisional application No. 60/254,241, filed on Dec. 7, 2000, provisional application No. 60/254,473, filed on Dec. 7, 2000.

(51) Int. Cl.
*G06F 9/46* (2006.01)
*G06F 15/173* (2006.01)
*G08B 13/14* (2006.01)
*G08B 23/00* (2006.01)

(52) U.S. Cl. .................. 718/100; 719/313; 709/238; 340/572.1; 340/693.9

(58) Field of Classification Search ........ 718/100–108; 709/201–203, 238; 700/90, 112, 113, 115; 719/313; 340/572.1, 693.9
See application file for complete search history.

(56) References Cited

U.S. PATENT DOCUMENTS 4,974,166 A  *  11/1990   Maney et al. ............... 700/113

(Continued)

FOREIGN PATENT DOCUMENTS

DE    43 41 880 A1    6/1995

(Continued)

OTHER PUBLICATIONS

Lassila, "Web Metadata: A Matter of Semantics", 1998, IEEE, pp. 30-37.*

(Continued)

*Primary Examiner*—Meng-Al T. An
*Assistant Examiner*—Jennifer N. To
(74) *Attorney, Agent, or Firm*—Finnegan, Henderson, Farabow, Garrett & Dunner, L.L.P.

(57) ABSTRACT

Computer-assisted procedure (501/502) to communicate data in a transportation system (90) that physically transports objects (800) from first to second locations (10, 20). The objects (800) have write/read memory tags (300). Prior to communicating data is separated into meta-data M and content-data C. Communicated are: C on the tags (300), M through a computer network, and type-data T (representing M) on the tags. System computers (901, 902, 900) perform complementary methods for forwarding (501) and retrieving (502). To forward (501) data from the first location (10), a first computer (901) queries (510) an exchange computer (901) with M for T according to a predefined T-to-M table, writes T to the tags (300), and writes C to the tags (300). To retrieve (502) data at the second location (20) where the objects arrive, a second computer (902) reads T from the (300), queries (550) the exchange computer (900) with T for M according to the same table, and reads (560) C from the tags (300).

13 Claims, 12 Drawing Sheets

U.S. PATENT DOCUMENTS

| | | | |
|---|---|---|---|
| 5,166,884 A | * | 11/1992 | Maney et al. ............... 700/113 |
| 5,469,363 A | * | 11/1995 | Saliga ........................ 700/225 |
| 5,936,527 A | * | 8/1999 | Isaacman et al. ........ 340/572.1 |
| 5,963,134 A | * | 10/1999 | Bowers et al. ........... 340/572.1 |
| 5,971,592 A | | 10/1999 | Kralj et al. |
| 6,032,127 A | | 2/2000 | Schkolnick et al. |
| 6,097,301 A | * | 8/2000 | Tuttle ...................... 340/693.9 |
| 6,177,860 B1 | * | 1/2001 | Cromer et al. ............. 340/10.1 |
| 6,195,006 B1 | * | 2/2001 | Bowers et al. ........... 340/572.1 |
| 6,259,367 B1 | * | 7/2001 | Klein ...................... 340/572.1 |
| 6,356,949 B1 | * | 3/2002 | Katsandres et al. ......... 709/238 |
| 6,842,121 B1 | * | 1/2005 | Tuttle ...................... 340/693.9 |
| 6,961,000 B1 | * | 11/2005 | Chung ...................... 340/572.1 |
| 7,005,985 B1 | * | 2/2006 | Steeves ................... 340/572.1 |
| 2001/0000019 A1 | * | 3/2001 | Bowers et al. ........... 340/572.1 |
| 2002/0144007 A1 | * | 10/2002 | Shteyn ....................... 709/313 |

FOREIGN PATENT DOCUMENTS

| | | |
|---|---|---|
| DE | 196 23 893 A1 | 12/1997 |
| DE | 198 44 631 A1 | 4/2000 |
| DE | 199 51 060 A1 | 5/2000 |
| DE | 199 55 120 A1 | 5/2001 |
| EP | 0 908 643 B1 | 4/1999 |
| GB | 2308947 A | 7/1997 |
| WO | WO 00/45324 | 8/2000 |

OTHER PUBLICATIONS

Want et al., "Ubiquitous Electronic Tagging", 1999, IEEE, pp. 1-6.*

* cited by examiner

SYSTEM, METHOD, COMPUTER PROGRAM PRODUCT FOR COMMUNICATING DATA FOR OBJECTS THAT ARE TRANSPORTED FROM FIRST LOCATION TO SECOND LOCATION

CROSS REFERENCE TO RELATED APPLICATIONS

This application claims the benefit of U.S. Provisional Application Ser. No. 60/254,241, filed Dec. 7, 2000 and U.S. Provisional Application Ser. No. 60/254,473, filed Dec. 7, 2000 the content of both of which is incorporated herein by reference.

FIELD OF THE INVENTION

The present invention generally relates to data processing and, more particularly, relates to distributed computer systems, methods, and computer programs for communicating data associated with objects that are transported from a first location to a second location.

BACKGROUND OF THE INVENTION

In almost all fields of industrial activity, small and large objects are transported. Attaching a tag (or "marker") to each object becomes more and more important. Often, the tag comprises a radio frequency identifier (RFID) with a small chip and an antenna so that the tag exchanges data with a computer via radio waves. Tagging objects found widespread application such as for goods receipt and shipment management, production control, merchandise management, lot control, expiry data management, point of sales, etc.

U.S. Pat. No. 5,936,527 B1 (Isaacman et al.) discloses locating and tracking documents and other objects by a radio frequency document control system.

DE 4341880 A1 discloses to store manufacturer specific data in a tag for reading by an external device and for subsequent data processing.

GB 2 308 947A (Howell et al.) discloses a tag that identifies itself by a transmitted code.

WO 00/45324 (Besnard) discloses to associate a read/write RFID tag with a product to be processed, to process the product, to write process information to the tag, and to further process the product depending on the process information of the previous process.

EP 0908643 (Sorells) discloses construction details of a Radio Frequency Identification (RFID) security tag for attachment to a small article of merchandise to monitor the tagged item.

U.S. Pat. No. 5,166,884 B1 (Maney at al.) describes an intelligent system for processing and storing articles. The system is mounted with a transportable container for carrying articles (e.g., semiconductor wafers) that comprises a non-volatile memory used to store the identity, status and history of the articles in the container. Further described is transmitting data from the memory to an information processor.

U.S. Pat. No. 4,974,166 B1 (also Maney et al.) describes processing systems with intelligent article tracking.

U.S. Pat. No. 5,469,363 B1 (Saliga) discloses an inventory control system. An electronic tag that keeps an unalterable log of each step in the handling of a controlled item, which may be a flight safety critical aircraft replacement part. The tag is electrically powered via inductive coupling to a computer with which it communicates, and comprises a non-volatile computer memory element configured so that data may be written into unused portions of it, but so that no existing data can be overwritten or erased.

DE 199 55 120 A1 teaches a carrier-transponder with data that describes environment conditions (e.g. temperature) recorded during a time period previous to reading. The transponder has an individual identification (electronically readable) and has dedicated memory portions allocated to dedicated organizations (e.g., shipping agency) to allow specific object identification.

DE 198 44 631 A1 (Gantner et al.) describes a tag with a protected memory portion for a tag identification number and owner identification number.

DE 199 51 060 A1 (Boede et al.) discloses to provide a computer system at manufacturing time with an automatic customer identification for later use to identify the computer to a manufacturer website.

DE 196 23 893 A1 (Bischof) describes transmitting digital coded signal when transmitting data from medium B to medium A, medium A is caused to request further data from medium C, wherein C stores a database with profile data of the user of medium A as well as stores data to be transmitted to A.

U.S. Pat. No. 5,963,134 B1, U.S. Pat. No. 6,195,006 B1 (P), and U.S. Publication No. 2001 0000 019 A1 (P) (all Bowers et al.) describe inventory systems using articles with RFID tags. Each tag has a unique identification or serial number for identifying the individual article. An inventory database tracks all of the tagged articles and maintains circulation status information for each article.

The advertising material "RFID Integration with SAP" provided by SAP Aktiengesellschaft, Walldorf (Baden), Germany, discloses the use of RFIDs in the context of business applications.

U.S. Pat. No. 6,177,860 B1 (P) (Cromer et al.) describes a method of asset control and workstation computer deployment that utilizes a dual port electronic memory identification RFID tag to hold serial number and hardware and software configuration profiles as well as user information.

U.S. Pat. No. 6,259,367 B1 (P) (Klein) discloses affixing to an object a passive two-way communication circuit such as a radio security tag or smart label. The tag or label, when operational, is arranged to receive a remotely generated request for status information and, responsive to the request, to transmit status information to a remote device. The circuit is associates with an URL for launching a web browser program.

Documents with (P) have been published during the priority interval of the present application.

However, the use of tagged objects is not free of technical or organizational challenges. Objects and tags often cross company borders. Both locations (i.e. companies) might use different data formats. Heterogeneous data processing requires data conversion at least at one location. The available technology sometimes limits the memory in each tag by capacity and speed: First, it might be not feasible to store as much data as desired because the memory size is small. Second, for read/write operations, there might be not enough time to communicate as much data as desired. In other words, the memory is sometimes small and slow in terms of bits and bit rates; but a large and fast memory is not available or not affordable. Different data format and different objects often cause non-uniformity in memory size. Some data on the tag is not relevant for reading. Writing to tags and reading from tags cause network load. The present invention seeks to alleviate some or all of the identified problems.

SUMMARY OF THE INVENTION

Generally, the present invention relates to a computer-assisted procedure to communicate data in a transportation system that physically transports objects from a first location to a second location. The objects have read/write memory tags. Data is communicated in parallel from the first to the second location too. Prior to communicating, data is separated into meta-data (M) and content-data (C), respectively. Content-data (C) and type-data (T) is communicated on the tags. Meta-data (M) is communicated through a computer network. Type-data (T) represents meta-data (M). Type-data (T) has smaller volume than meta-data (M). System computers perform complementary methods for forwarding and retrieving data. To forward data from the first location, a first computer queries an exchange computer with meta-data (M) for type-data (T) according to a predefined type-to-meta table, writes type-data (T) to the tags, and writes content-data (C) to the tags. To retrieve data at the second location when the objects are arriving, a second computer reads type-data (T) from the tags, queries the exchange computer with type-data (T) for meta-data (M) according to the same table, and reads content-data (C) from the tags.

The invention relates to a procedure for transmitting content-data and meta-data for an object in a transportation system that physically transports the object from a first location to a second location and that uses a data tag at the object, that uses a first application computer at the first location, that uses a second application computer at the second location, that uses an exchange computer at least temporarily coupled to the first and second application computers. The procedure involves to perform a first method by the first computer at the first location and—consecutively—to perform a second method at the second location. The procedure is characterized in that the first method has the following steps: querying the exchange computer with meta-data for type-data; writing type-data to a first memory portion of the tag; and writing content-data to a second memory portion of the tag. The procedure is further characterized in that the second method has the following steps: reading type-data from the first memory portion of the tag; querying the exchange computer with type-data for meta-data, and reading content-data from the second memory portion of the tag.

A method for forwarding predefined meta-data and predefined content-data from a first computer to a second computer involves predefined meta-data and predefined content-data that relate to an object that is transported in a transportation system from a first location to a second location. The first computer serves the first location and the second computer serves the second location. The method comprises the following steps to be performed by the first computer:

querying an exchange computer with meta-data for type-data, the exchange computer storing a meta-data to type-data assignment table such that the second computer is able to query the exchange computer with type-data for meta-data once the object has arrived at the second location;

writing type-data to a first memory portion of the tag such that the second computer is able to read type-data from the first memory portion of the tag; and writing content-data to a second memory portion of the tag such that the second computer is able to read the content-data from the second memory portion of the tag once the object has arrived at the second location.

A method for retrieving meta-data and content-data relating to an object that has been transported in a transportation system from a first location to a second location comprises the following steps performed by a computer:

reading type-data from the first memory portion of a tag attached to the object, type-data having been written to the first memory portion of the tag by a further computer that has queried an exchange computer with meta-data for type-data, querying the exchange computer with type-data for meta-data; and reading content-data from a second memory portion of the tag, wherein the further computer has written content-data to the second memory portion of the tag.

A computer-assisted procedure to communicate data in a transportation system that physically transports objects from a first location to a second location (wherein the objects have write-read memory tags, wherein prior to communicating data is separated into meta-data and content-data, respectively) comprises: communicating content-data on the tags, communicating meta-data through a computer network, and communicating type-data that represents meta-data on the tags.

Preferably, the system computers perform complementary methods for forwarding data and for retrieving data, wherein to forward data from the first location, a first computer queries an exchange computer with meta-data for type-data according to a predefined type-to-meta table, writes type-data to the tags, and writes content-data to the tags, to retrieve data at the second location where the objects are arriving, a second computer reads type-data from the tags, queries the exchange computer with type-data for meta-data according to the same table, and reads content-data from the tags.

Preferably, the first computer selectively queries a first and a second exchange computer, and wherein the second computer selectively queries the first and the second exchange computers depending on the type data.

A computer-program product with processor code means causes a first computer to forward predefined meta-data and predefined content-data to a second computer (predefined meta-data and predefined content-data relate to an object that is transported from a first location to a second location). The computer-program product comprises:

first code means for querying an exchange computer with meta-data for type-data, wherein the exchange computer stores a meta-data to type-data assignment table such that the second computer is able to query the exchange computer with type-data for meta-data once the object has arrived at the second location;

second code means for writing type-data to a first memory portion of a tag at the object such that the second computer is able to read type-data from the first memory portion of the tag; and third code means for writing content-data to a second memory portion of the tag such that the second computer is able to read the content-data from the second memory portion of the tag once the object has arrived at the second location.

A computer-program product with processor code means to cause a computer to retrieve meta-data and content-data (relating to an object that has been transported in a transportation system from a first location with a further computer to a second location) comprises:

first code means for reading type-data from the first memory portion of a tag attached to the object, type-data having been written to the first memory portion of the tag by the further computer that has queried an exchange computer with meta-data for type-data, second code means for querying the exchange computer with type-data for meta-data; and third code means for reading content-data from a second memory portion of the tag, wherein the further computer has written content-data to the second memory portion of the tag.

A computer system with a first application computer, a second application computer, and an exchange computer (coupled at least temporarily) supports a transportation system that physically transports an object with a tag from a first location to a second location. The computer system transmits content-data and meta-data relating to the object. The first computer at the first location has means for querying the exchange computer with meta-data for type-data; means for writing type-data to a first memory portion of the tag; and means for writing content-data to a second memory portion of the tag. The second computer at the second location has means for reading type-data from the first memory portion of the tag; means for querying the exchange computer with type-data for meta-data; and means for reading content-data from the second memory portion of the tag.

Advantages of the present invention are, for example: Type-data (T) is commonly available at both locations. The exchange computer can perform data conversion, for example, for meta-data (M). Data communication becomes homogeneous. Since type-data (T) need less memory space than meta-data (M), technical limitations of memory size and of read/write operations do not prevent communicating bulk data. Meta-data (M) can be as large as memory capacity of the exchange computer allows. Type-data (T) optionally codes the length of content-data (C), so that non-uniformity in memory size is no longer a challenge. Type-data (T) optionally codes to what extent content-data (C) is required at the second location. Depending on T, C is used partially or completely. Type-data (T) and meta-data (M) do not need to be communicated for every object when objects are similar. Network load is reduced.

DETAILED DESCRIPTION OF THE INVENTION

Figure 1:
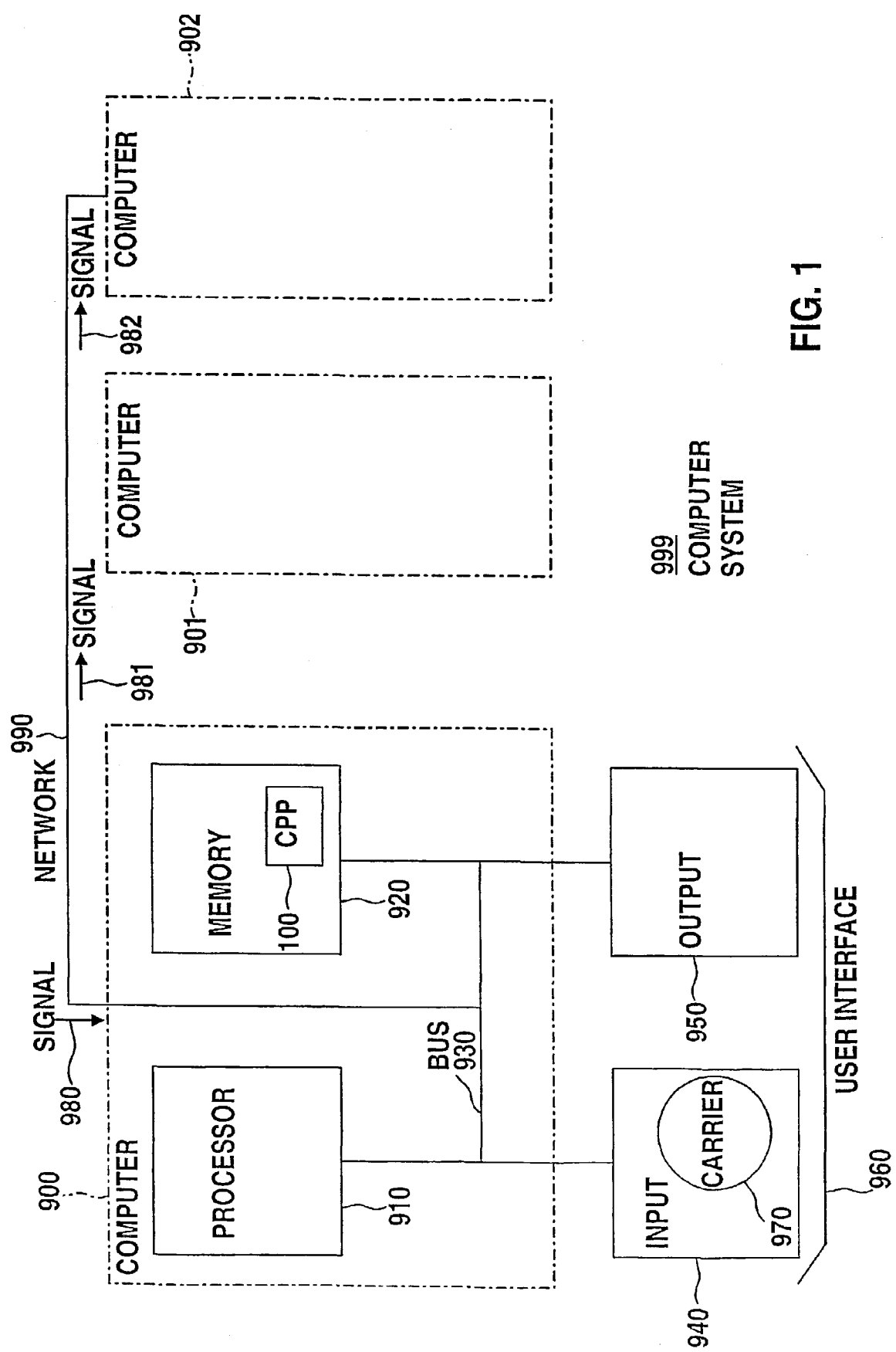
FIG. 1 illustrates a simplified block diagram of a computer network system having a plurality of computers.

A list of reference numbers is provided prior to the claims. For convenience of explanation, terms are used as follows:

Object stands for any physical item that can be moved, such as a merchandize item or product, a container, a book, a periodical, magnetic or optical media, a package, a letter, a painting, an electronic device, an animal, an automobile, a bicycle, or the like.

"Tag" stands for any communication apparatus attached to the object, also referred to as "smart digital object SDO" or "smart label". "Tagged object" or "tag/object combination" stand for an object with one or more tags. Preferably, a single object has a single tag; optionally, further embodiments can be implemented with multiple objects sharing a single tag. Single objects with multiple tags are also possible. "Location" stands for any area, such as a warehouse, a vehicle, a production site, an office, a company, or a retail store.

"Transponder" stands for a communication means in the tag to assist read/write operations with the computer. Preferably, transponder and computer use wireless signals, such as radio frequency signals, infrared signals, inductive signals, magnetic signals, or optical signals.

"Writer W" and "reader R" stand for a communication means associated in the computer to read data from the tag and or to write data to a tag. "Memory" stands for any storage means in the tag to temporarily store data.

"Application" stand for any computer business program to assist business processes such as Customer Relationship Management (CRM), Enterprise Resource Planning (ERP), or Supply Chain Management (SCM). The present invention allows adding functionality to applications without the need to rewrite them. Tags, objects, transponders, memory, writer, reader, and applications are well known in the art, examples have been given in the background section.

"Function" stands for a predefined program code in a computer program, also referred to as "method" and indicated by empty parenthesis ( ).

The verb "transport" stands for physically displacing the object from a first location to a second location, for example, by vehicles, conveyors, containers, or human action. Transportation is well known in the art.

The verbs "transmit", "receive", and stand for making data available from computer A to computer B, and also stands for making data available from computer program A to computer program B. The verb "write" stands for modifying data on the memory of the tag (e.g., add, change or delete data); the verb "read" stands for copy data from the tag to a computer.

The verb "query" stands for bi-directional communication between computers A and B, wherein B uses an X-to-Y assignment table. In phrases like "A queries B with X for Y", computers A and B operate in the following order: A transmits data X to B, B receives X from A, B identifies Y, B transmits data Y to A, and A receives data Y from B.

The verbs "forward" collectively stands for coordinated actions of a first computer: transmitting data (i.e. computer-to-computer) and writing data (i.e. computer-to-tag). Complementary thereto, "retrieve" collectively stands for coordinated actions of a second computer: receiving data (i.e. computer-to-computer) and reading data (i.e. tag-to-computer).

Indices such as (i) and (i+1) distinguish different objects. Sequential handling is preferred (i.e. (i) first, (i+1) second), simultaneous handling (i.e. (i) and (i+1) in parallel) is within the scope of the invention.

"Content-data" ("C", or "actual data", or "raw data") is data that describes properties of the object. "Meta-data" ("M") is data that describes properties of content-data C. Type-data ("T") is data that is assigned to particular sets of meta-data M. The distinction between content-data C and meta-data M is predefined by an administrator. It is advisable to classify data that is common to a majority of objects as meta-data M (e.g., "all objects are books") and to classify data that is particular to a minority of objects as content-data C (e.g., a particular book title).

An identifier is an alphanumeric value that represents type-data T.

Further abbreviations are introduced to simplify the explanation, for example "memory 322 (of 320 of 300)" abbreviates memory portion 322 of memory 320 of tag 300; "code 110–130 (of 101)" abbreviates code 110, 120 and 130 of computer program product 101; "steps 510–530 (of 501)" abbreviates steps 510, 520, 530 of method 501.

FIG. 1 illustrates a simplified block diagram of the inventive computer network system 999 having a plurality of computers 900, 901, 902 (or 90$q$, with q=0 . . . Q−1, Q any number).

Computers 900–902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910–980 in computer 900 collectively illustrate also corresponding elements 10$q$ and 91$q$–98$q$ (shown for q=0) in computers 90$q$.

Computer 900 is, for example, a conventional personal computer (PC), a desktop and hand-held device, a multi-processor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner, or a disk drive. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or a display, (cathode ray tube (CRT), flat panel display, liquid crystal display (LCD), speaker, printer, plotter, vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900–902 are referred to as "network 990". Optionally, network 990 comprises gateways being computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are known, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), Standard Generalized Markup Language (SGML) etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

The explanation now continues with details for the present invention. For convenience of further explanation, the following scenario is assumed: The first location is a warehouse for books and music disks. The warehouse first ships a book with the title "ALPHA" (i.e. object (i)) and second ships a disk with the title "BETA" (i.e. object (i+1)). The second location is a retail store that—in any order of time—checks the book and the disk. Using the tag-and-computer communication of the present invention, a computer at the retail store detects that the objects are the book ALPHA and the disk BETA. In terms of meta-data and content-data, "book" and "disk" is meta-data M, and "ALPHA" and "BETA" is content-data C.

Figure 2:
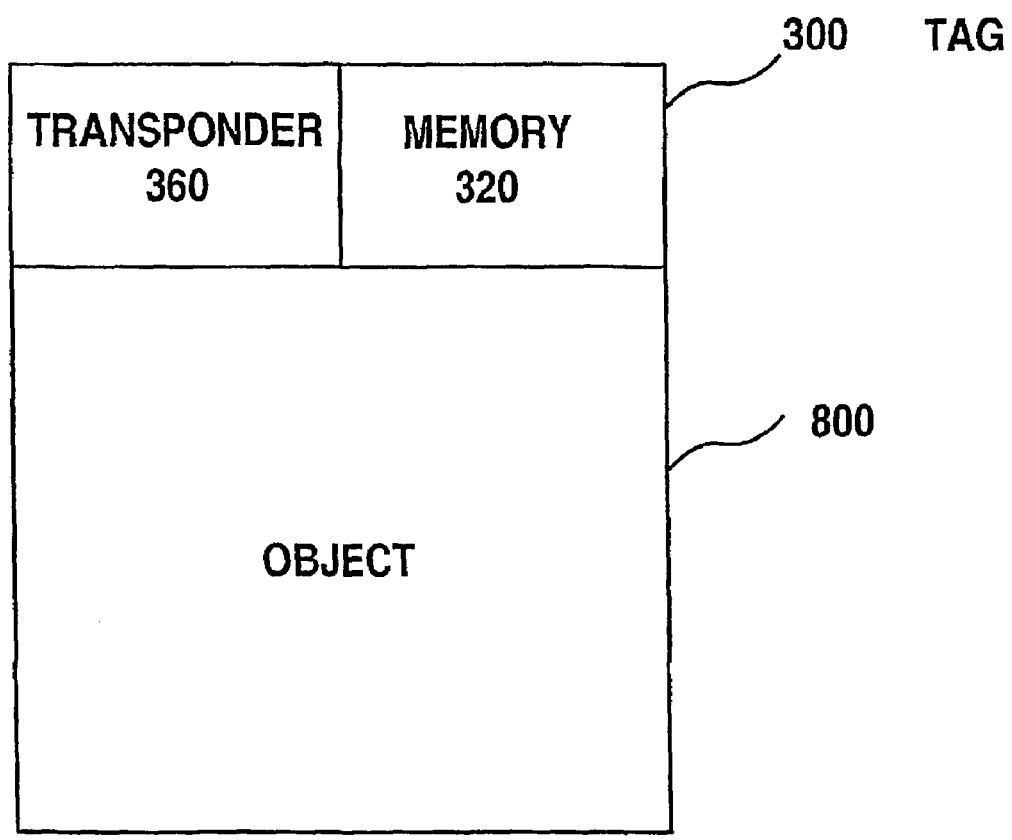
FIG. 2 illustrates a simplified block diagram of an object in combination with a tag.

FIG. 2 illustrates a simplified block diagram of object 800 in combination with tag 300. Tag 300 has transponder 360 and memory 320. Transponder 360 optionally has a processor (not shown). Preferably, non-processor transponders communicate with computers via proxies in the computer. Details for proxy and non-proxy versions are illustrated in connections with FIGS. 11–12.

Figure 3:
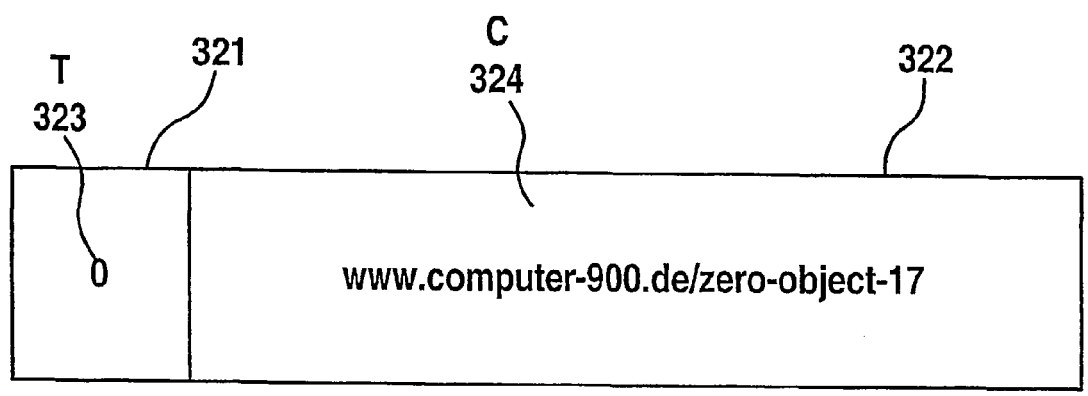
FIG. 3 illustrates a simplified memory allocation diagram for a first embodiment.

FIG. 3 illustrates a simplified memory allocation diagram for memory 320. First memory portion 321 (or "address space") stores type-data 323 (hereinafter "type-data T"); second portion 322 stores content-data 324 (hereinafter "content-data C"). In the example of FIG. 3, portion 321 has one byte and stores type-data T by an identifier with a numeric value between 0 and 15. For the value "0" of type-data T, meta-data M means to store content-data C as Unified Resource Locator (URL) where further information about object 300 can be obtained. Here, the URL "www-.computer-900. de/zero-object-17", indicates that that computer 900 at "domain computer-900. de" has a directory "zero-object" where object 300 is identified by number "17".

Depending on the value for type-data T, various predefined definitions for meta-data M are possible, for example: Type-data T with value "1": Meta-data M in the meaning "content-data C is the title of a book." Type-data T with value "2": Meta-data M in the meaning "content-data C is the title of disk". Type-data T with value "3": Meta-data M in the meaning that "content-data C is a text in markup language that marks up further meta-data". For example, in content-data "<book_title>-ALPHA</book_title>", XML-delimiter-symbols "<" and ">" identify that the text within the symbols is a book with the title "ALPHA". Type-data T with value "4": content-data C is stored at predefined addresses within memory.

Persons of skill in the art can provide further definitions. Modifications are possible. There is no need to have portion 321 "left of" portion 322; it is sufficient to have portions 321 and 322 at predefined addresses within memory 320. The number of bytes in portions 321 and 322 can be variable.

Figure 4:
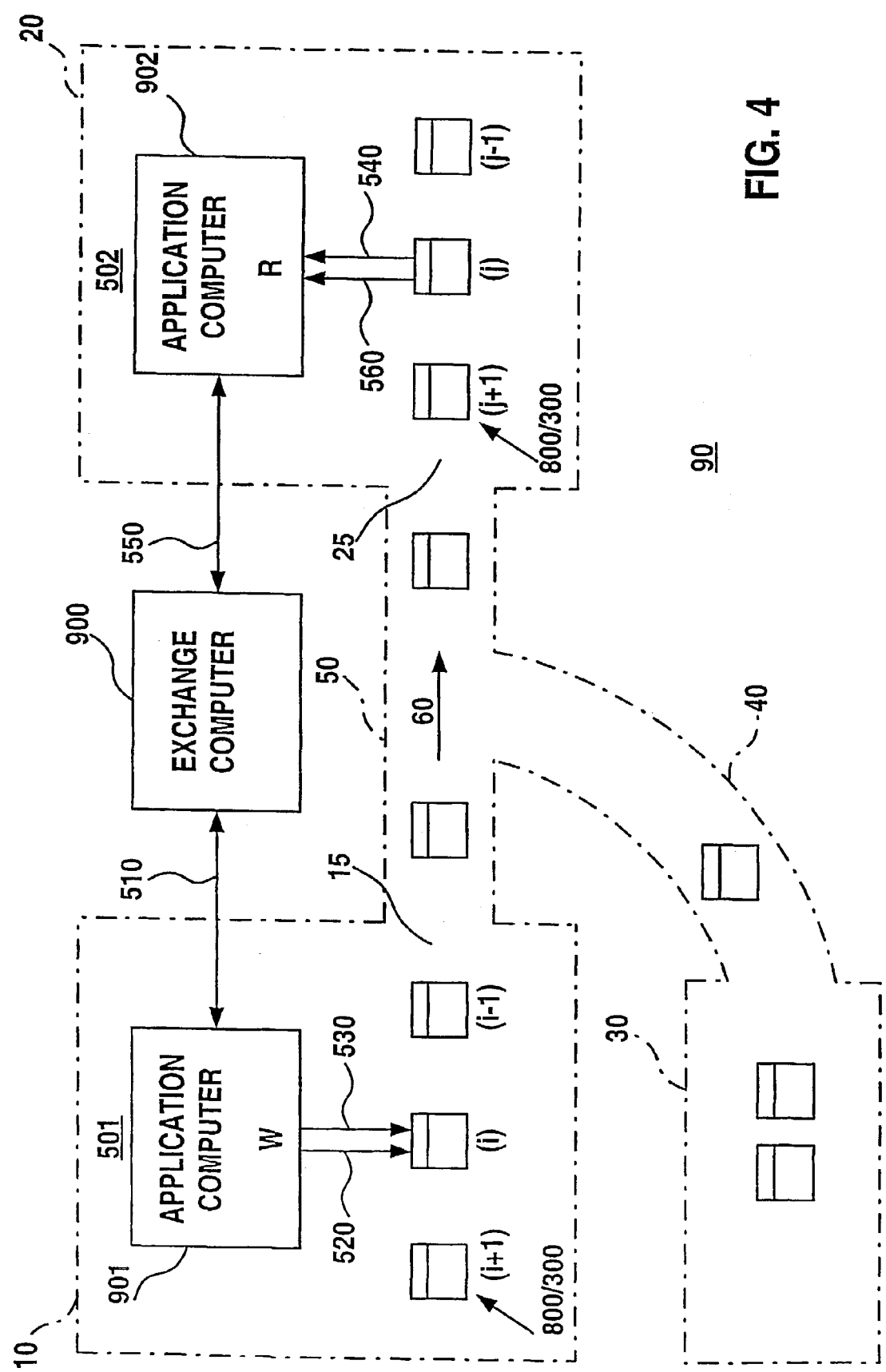
FIG. 4 illustrates a simplified block diagram of first and second locations, tag/object combinations, application computers at the locations as well as an exchange computer.

FIG. 4 illustrates a simplified block diagram of first location 10, second location 20, a plurality of tag/object combinations 800/300, application computer 901 serving location 10, application computer 902 serving location 20, as well as exchange computer 900 serving both locations 10 and 20. Transportation system 90 with locations 10 and 20 and transportation channel 50 is illustrated by dashed frames. Combinations 800/300 are being transported (arrow 60) from location 10, via exit 15, via channel 50, and via entrance 25 ("entry gate") to location 20.

The physical location of computers 901, 902 and 900 is not important for the present invention. Computers 901, 902 and 900 communicate each other via network 990 (cf. FIG. 1, not shown in FIG. 4). Writer and reader at computers 901 and 902 are symbolized as "W" and "R". At location 10, computer 901 had been communicating with combination 800/300 (i−1) in the past, is communicating with combination 800/300 (i) at present, and will be communicating with combination 800/300 (i+1) in the future. At location 20, computer 902 had been communicating with object/tag combination 800/300 (j−1) in the past, is being communicating with combination 800/300 (j) at present, and will be communicating with combination 800/300 (j+1) in the future. Due to different transportation times for different object/tag combinations, the order might change: combinations leaving location 10 in the order (i) (i+1) might arrive at location 20 in the opposite order.

Plain arrows 510–560 stand for data flow during the executing of method steps (cf. FIGS. 6–7) according to the present invention. Computers 901 and 902 perform complementary methods 501 and 502, respectively, while communicating with exchange computer 900.

Optionally, object/tag combinations 800/300 are transported from further location 30 to location 20 via further channel 40.

Figure 5:
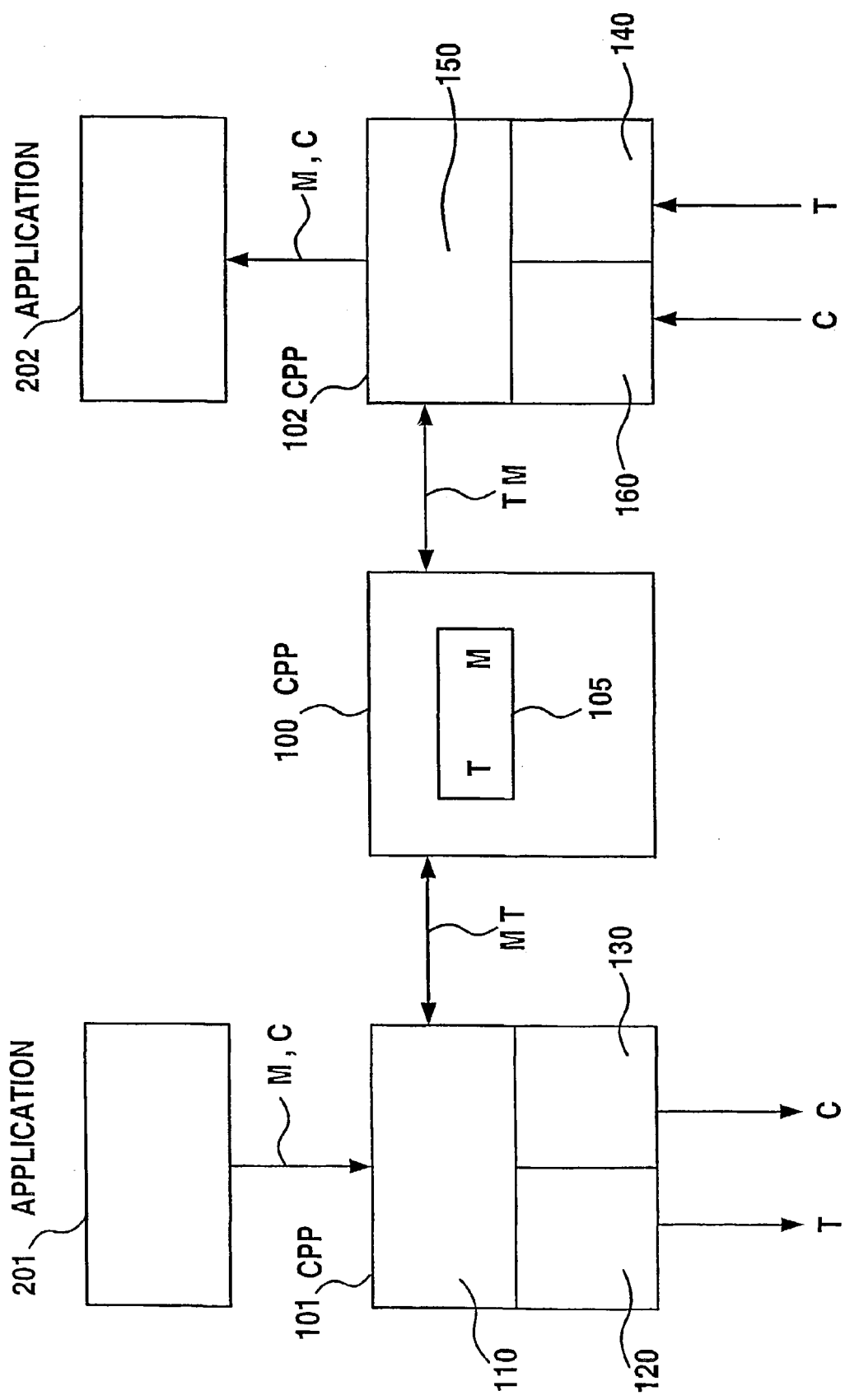
FIG. 5 illustrates an overview about computer program products used in the computers of FIG. 4.

FIG. 5 illustrates an overview about computer program products (CPP) used in the computers of FIG. 4. CPP 101 and 102 are interfaces that are logically coupled to applications 201 and 202 at computers 901 and 902, respectively. CPP 101 receives meta-data M and content-data C from application 201; in turn, CPP 102 returns meta-data M and content-data C to application 202.

Preferably, CPP 101, 102 and 100 operate at computers 901, 902 and 900, respectively. Performing CPPs and applications on the computers as illustrated is convenient but not necessary for the present invention. Any other computers can perform CPP and applications as well.

Code 110–130 (of 101) implement steps 510–530 (of 501), respectively; code 140–160 (of 102) implement steps 540–560 (of 502), respectively; CPP has T-to-M/M-to-T assignment table 105 that cooperates with code 110 and 150 during steps 510 and 550, respectively. In other words, CPP 100 operates as a repository that provides T for M, and that provides M for T. In other words, the assignment in table 105 is bi-directional and bijective.

Code 110 queries table 105 (of 100) with meta-data M for type-data T (i.e. MT-conversion). Code 120 writes type-data T into memory 321 (of 320 of 300). Preferably, code 120 is implemented by the function "SetDataType( )". Code 130 writes content-data C into memory 322 (of 320 of 300). Preferably, code 130 is implemented by the function "SetData( )".

Code 140 reads type-data T from memory 321 (of 320 of 300). Preferably, code 140 is implemented by the function "DiscoverDataType( )". Code 150 queries CPP 100 with type-data T for meta-data M (i.e. TM-conversion). Code 160 reads content-data C from memory 322 (of 320 of 300). Preferably, code 160 is implemented by the function "GetData( )".

Figure 6:
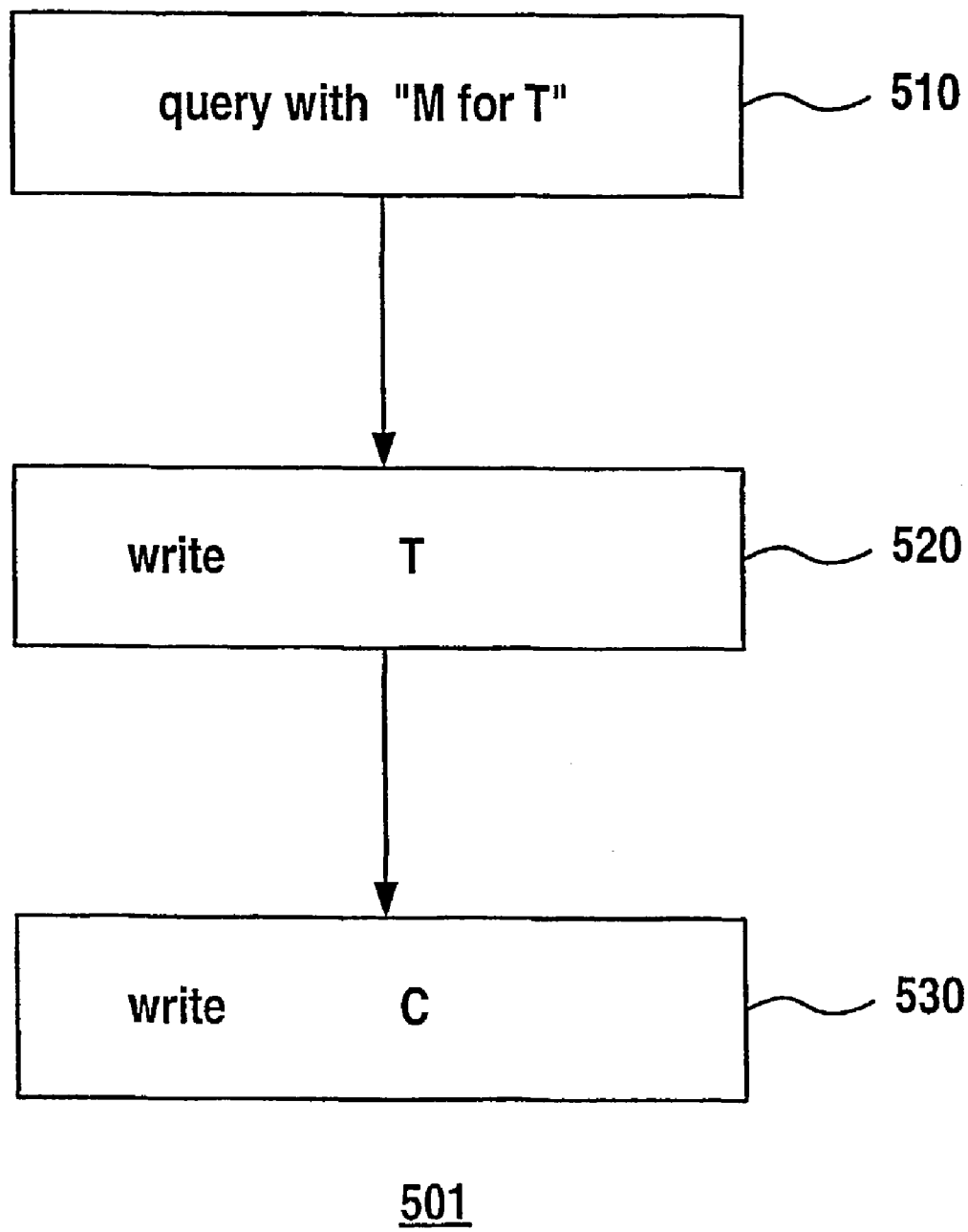
FIG. 6 illustrates a simplified method flow chart diagram of a first method of the present invention.

FIG. 6 illustrates a simplified method flow chart diagram of method 501 of the present invention. Method 501 is performed by computer 901 and comprises querying 510 exchange computer 900 with meta-data M for type-data T; writing 520 type-data T to memory portion 321 (of 300); and writing 530 content-data C to memory portion 322 (of 300). Although explained separately, writing steps 520 and 530 can be performed substantially at the same time.

Figure 7:
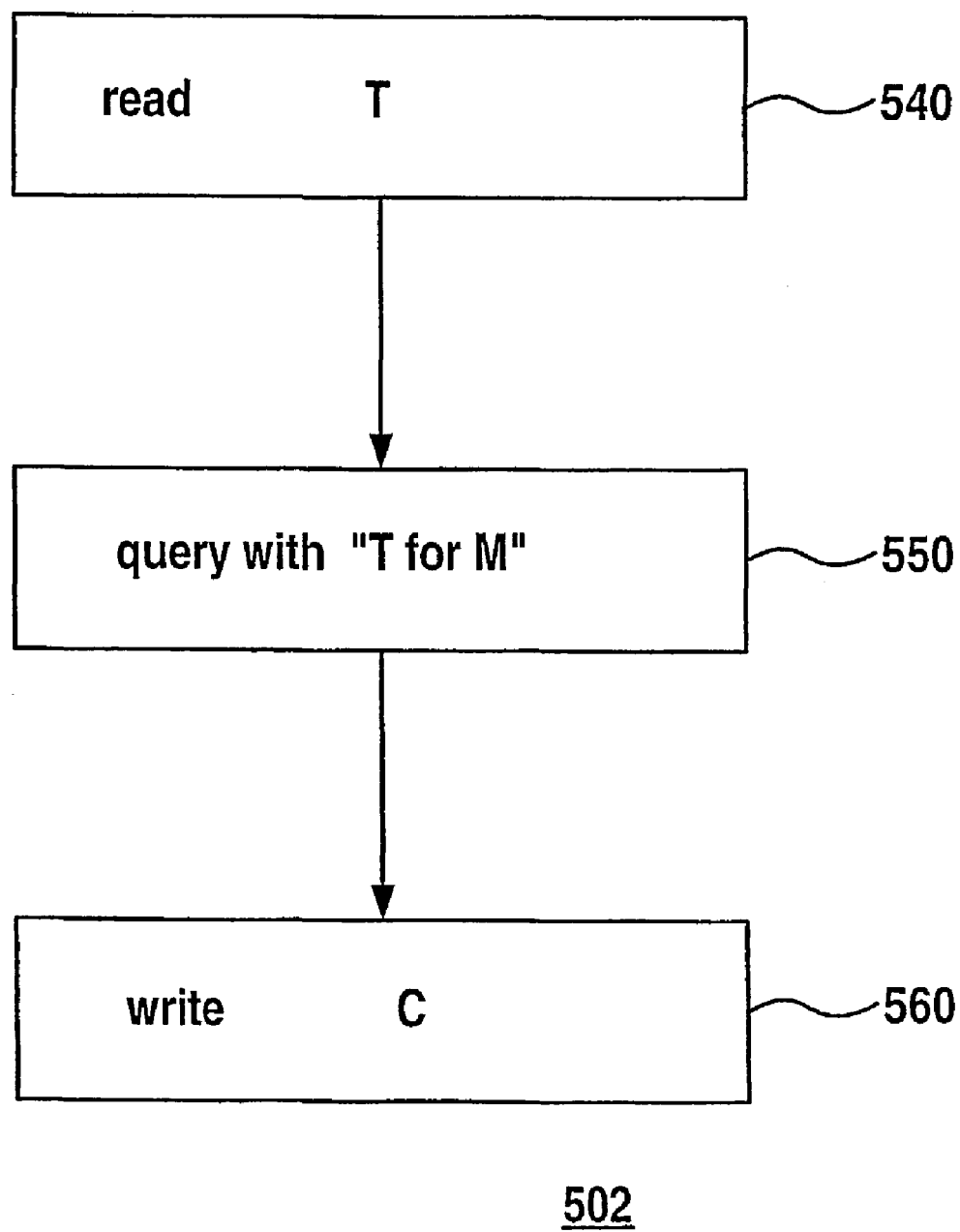
FIG. 7 illustrates a simplified method flow chart diagram of a second method of the present invention.

FIG. 7 illustrates a simplified method flow chart diagram of method 502 of the present invention. Method 502 is performed by computer 902 and comprises reading 540 type-data T from memory portion 321 (of 300); querying 550 exchange computer 900 with type-data T for meta-data M; and reading 560 content-data C from memory portion 322 (of 300).

Persons of skill in the art can combine reading 540 and 560 to read all data that is on tag 300 and later distinguish type-data T from content-data C. Also, for both methods, communication with exchange computer 900 is not mandatory for each computer-to-tag communication (steps 520, 530, 540, 560). Buffering and caching techniques are well-known to those of skill in the art.

Figure 8:
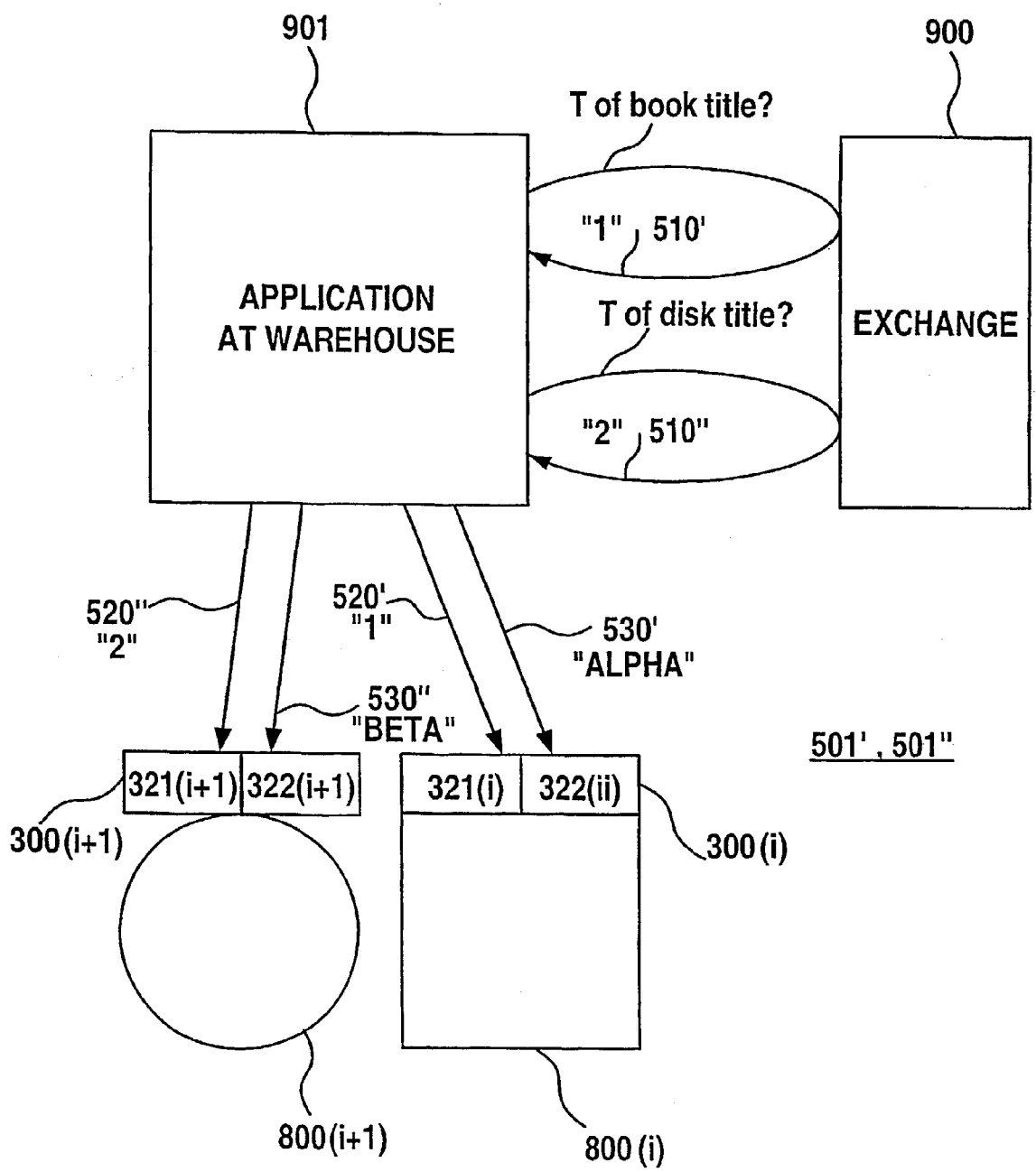
FIGS. 8–9 illustrate the present invention with details for the exemplary scenario with computers, disk and book objects, and tags.
Figure 9:
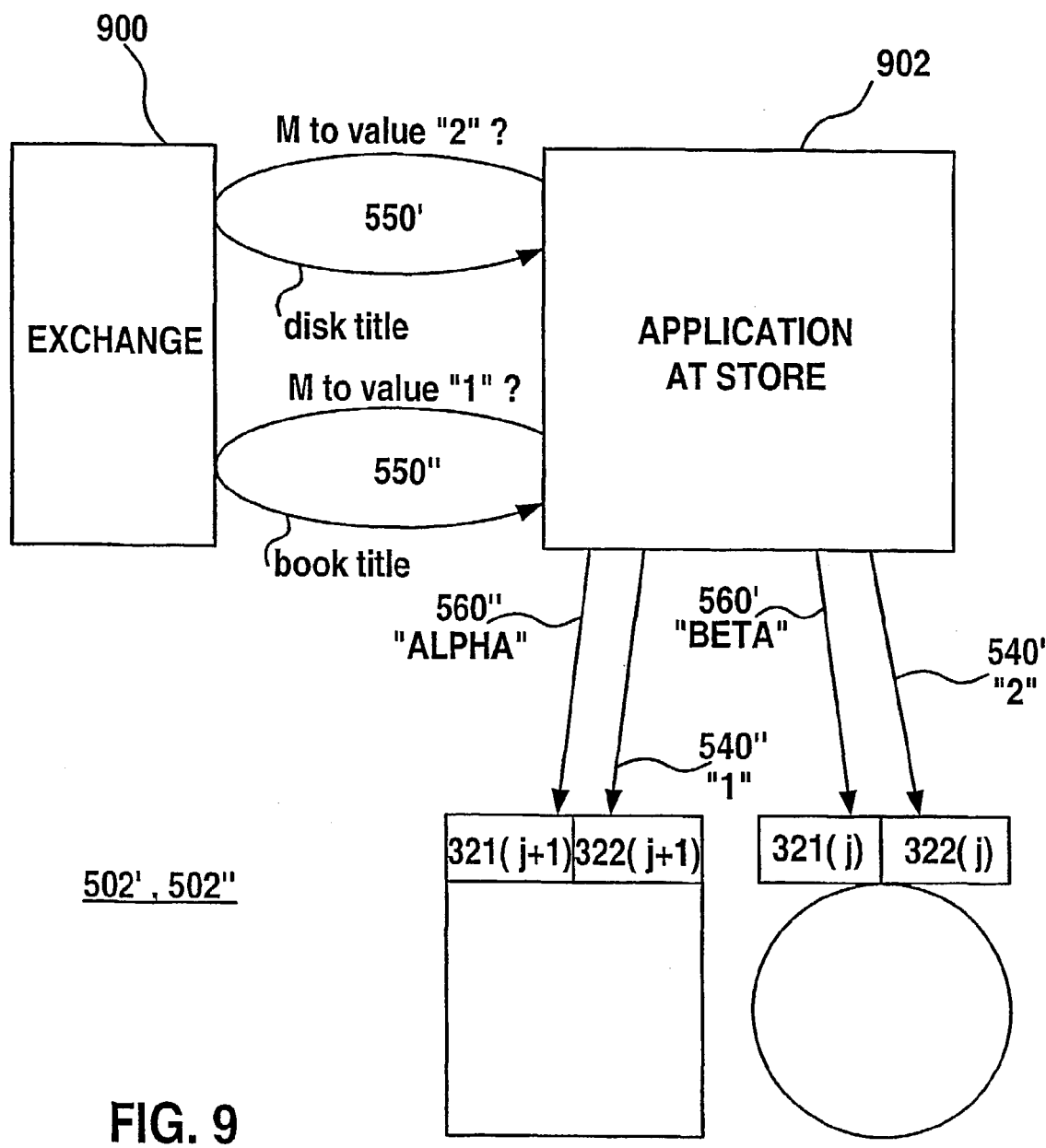

FIGS. 8–9 illustrates the present invention with details for the exemplary scenario with computers, disk and book objects, and tags. The figures symbolize the book by a square and the disk by a circle. As mentioned, in terms of meta-data and content-data, "book title" and "disk title" are meta-data M, and "ALPHA" and "BETA" are content-data C. Prime ' and double " prime markers at step numbers indicate a repeated execution of the methods. Assignment table 105 (cf. FIG. 5) in computer 900 states the following:

T M
"1" content-data C="book title"
"2" content-data C="disk title"

At the warehouse, computer 901 has the information that object 800 (i) is the book "ALPHA" and that object 800 (i+1) will be the disk "BETA". Tags 300 (i) and 300 (i+1) are already attached.

As in FIG. 8, application computer 901 executes method 501': In step 510', application computer 901 queries exchange computer 900 with M having the meaning "book title" and obtains type-data T having the value "1". In other words, computer 901 asks: "What is needed to indicate a 'book title' ?" In step 520', application computer 901 writes value "1" (i.e. identifier) into memory portion 321 (i). In step 530I, application computer 901 writes "ALPHA" into memory portion 322 (i).

Application computer executes method 501": In step 510", application computer 901 queries exchange computer 900 with M having the meaning "disk title" and obtains type-data T having the value "2". In other words, computer 901 asks: "What is needed to indicate a 'disk title' ?" In step 520", application computer 901 writes value "2" into memory portion 321 (i+1). In step 530", application computer 901 writes "BETA" into memory portion 322 (i+1).

As in FIG. 9, in the meantime both the book and the disk have been shipped to the retail store. Due to a delay, the disk arrives earlier than the book. For convenience of explanation, indices change to (j) for the disk and (j+1) for the book. At the store, application 202 does not yet have the information what is arriving.

Application computer 902 executes method 502': In step 540', application computer 902 reads value "2" from memory portion 322 (j). In step 550', application computer queries exchange computer 900 with type-data T having value "2" for meta-data M that has the meaning "disk title". In other words, computer 902 asks: "What does '2' mean?" In step 560', application computer 902 reads content-data C "BETA" from memory 322 (j).

Application computer 902 executes method 502": In step 540", application computer 902 reads value "1" from memory portion 322 (j+1). In step 550", application computer queries exchange computer 900 with type-data T having value "1" for meta-data M having the meaning "book title". In other words, computer 90 asks: "What does '1' mean?". In step 560", application computer reads content-data C "ALPHA" from memory 322 (j+1).

Now, computer 902 at the store has the same information as its counterpart computer 901 at the warehouse, i.e. book with the title "ALPHA" and disk with the title "BETA". As an advantage of the invention, the transportation order does not matter.

The present invention offers a variety of advantages (over the prior art). Methods, system and CPP can be used in variety of industries (e.g., automotive, pharmacy, semiconductor) or services (e.g., transportation).

The person who develops application 201 and 202 is relieved from writing access code to the portions of memory 320. Instead, using meta-data M is sufficient. For example, meta-data M like "book title" can be an easy-to-use variable name in applications 201 and 202.

As in other systems, tracing the transportation of objects is possible as well when each tag has its own identification number. The present invention provides a "generic interface" that allows to integrate a large variety of business applications to communicate with tagged objects. Changing the hardware (e.g., transponder 360, memory 320 or computer 900–902) does not require to change the applications. This is important for upgrading to new hardware.

Exchange computer 900 can be located anywhere: inside location 10, inside location 20, or outside both locations. Since communication with computer 900 is limited to TM and MT conversion, confidentiality concerns are alleviated. Computer 900 could be a server of a publicly available Internet site.

Storing meta-data M in assignment table 105 of CPP allows updating during the transportation of object 800 between locations 10 and 20.

The present invention can be combined with various well-known features: For example, using further information on tag ("dynamic data") like current temperature at tag, current location of tag or the like.

The following explains a further embodiment: Each tag 300 has 2 identifiers: "Object-ID" to identify object 800, and "Class-ID" as type-data T.

Each of identifiers Object-ID and Class-ID can have 2 parts. The first part has a Namespace-ID that identifies a namespace, and the second part has an Item-ID to identify a specific item in that namespace. Hence there are: (1) Object-ID with (11) Namespace-ID and (12) ItemID, and (2) Class-ID with (21) Namespace-ID and (22) Item-ID. This is convenient, because different organizations can use proprietary IDs without coordination with other organizations. The namespaces define a repository where information about meta-data M (e.g., computer 900) can be looked up. Optionally, the namespaces also define a repository where content-data C can be looked up, such as for a "home page of the object". For each namespace, separate exchange computers can be used.

For the (2) Class-ID, the combination of "(21) Namespace-ID=null", and "(22) Item-ID=null" has the meaning that the tag stores meta-data M and content-data C as XML. For the (2) Class-ID, the combination "(21) namespace-ID=any" and "(22) item-ID=null" has the meaning to instruct CPP 102 to use the (12) Item-ID of the (1) Object-ID to look up for meta-data M and content-data C at the repository identified by (21) Namespace-ID.

Staying in the explanation with the Class-ID (i.e. type-data T), table 105 can be organized in hierarchy to accommodate huge meta-data M items by low numbers of types T. Various hierarchical multi-level conventions are possible. For example, a class-ID has the two bytes "a" and byte "b". For $0<a<g<256$ and $b=0$, byte "a" identifies a global standard organization for looking up meta-data M at the URL of that organization. For $0<a<g<256$ and $0<b<256$, byte "b" indicates a sub-organization of the global organization. For $g<=a<r<256$ and $b=0$, byte "a" stands for a regional standard organization. Meta-data M is looked up at the URL of that organization. For $g<=a<=r<256$ and $0<b<256$, byte "b" stand for a sub-organization of the regional organization. For $r<=a<256$, the meaning is agreed upon between or inside organizations.

Figure 10:
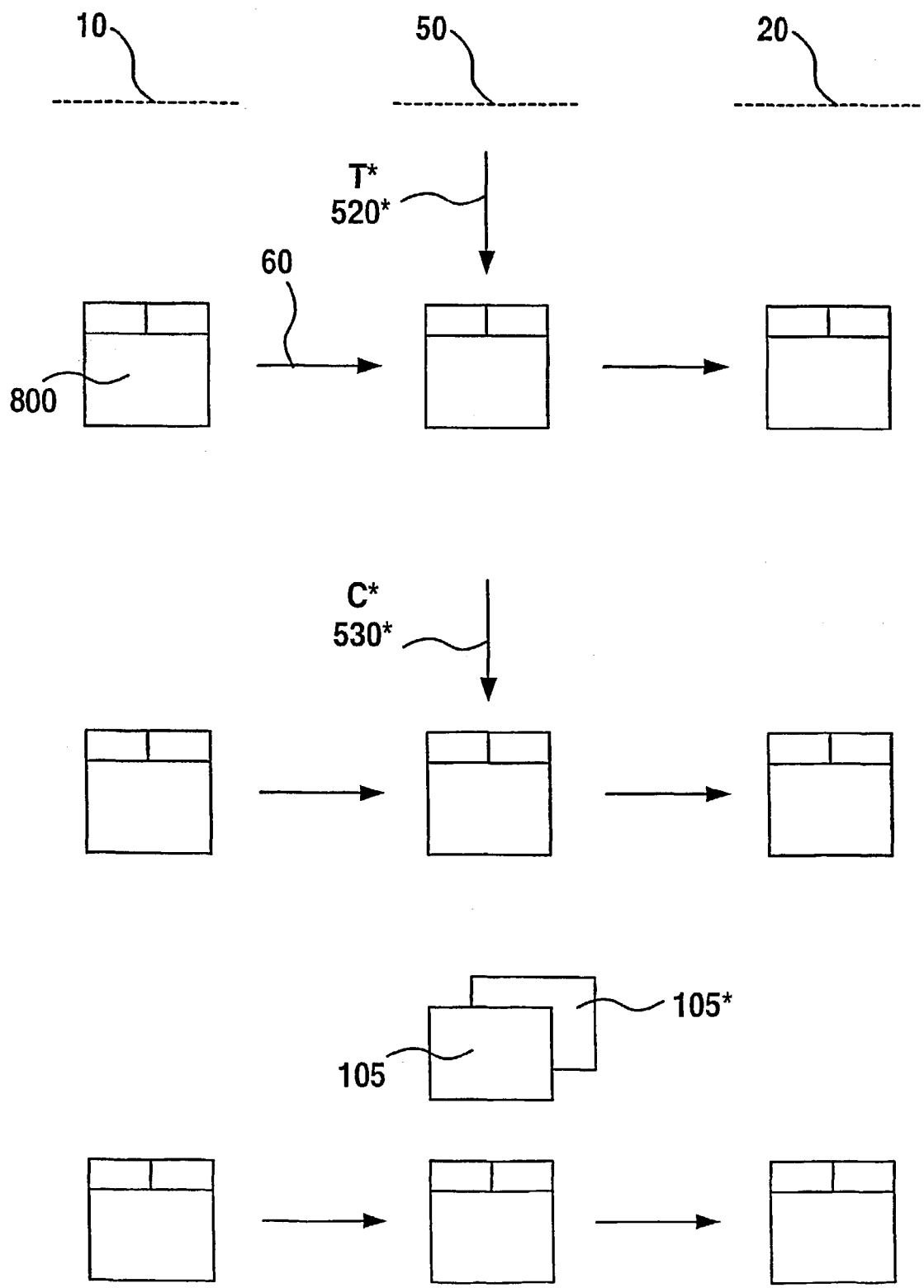
FIG. 10 illustrates data modification for objects traveling from the first location to the second location.

FIG. 10 illustrates data modification for objects 800 traveling (arrow 60) from the first location 10 to the second location 20 via channel 50 (symbolized by dashed lines). As illustrated at the top, additional writing step 520* replaces type-data T with a modified type-data T*, wherein content-data C remains unchanged. As illustrated in the center, additional writing step 530* replaces content-data C* with modified content-data C*, wherein type-data T remains unchanged.

As illustrated below, table 105 is modified to table 105* for a new assignment. This allows adding further meta-data M. It is advisable to preserve down-compatibility.

Figure 11:
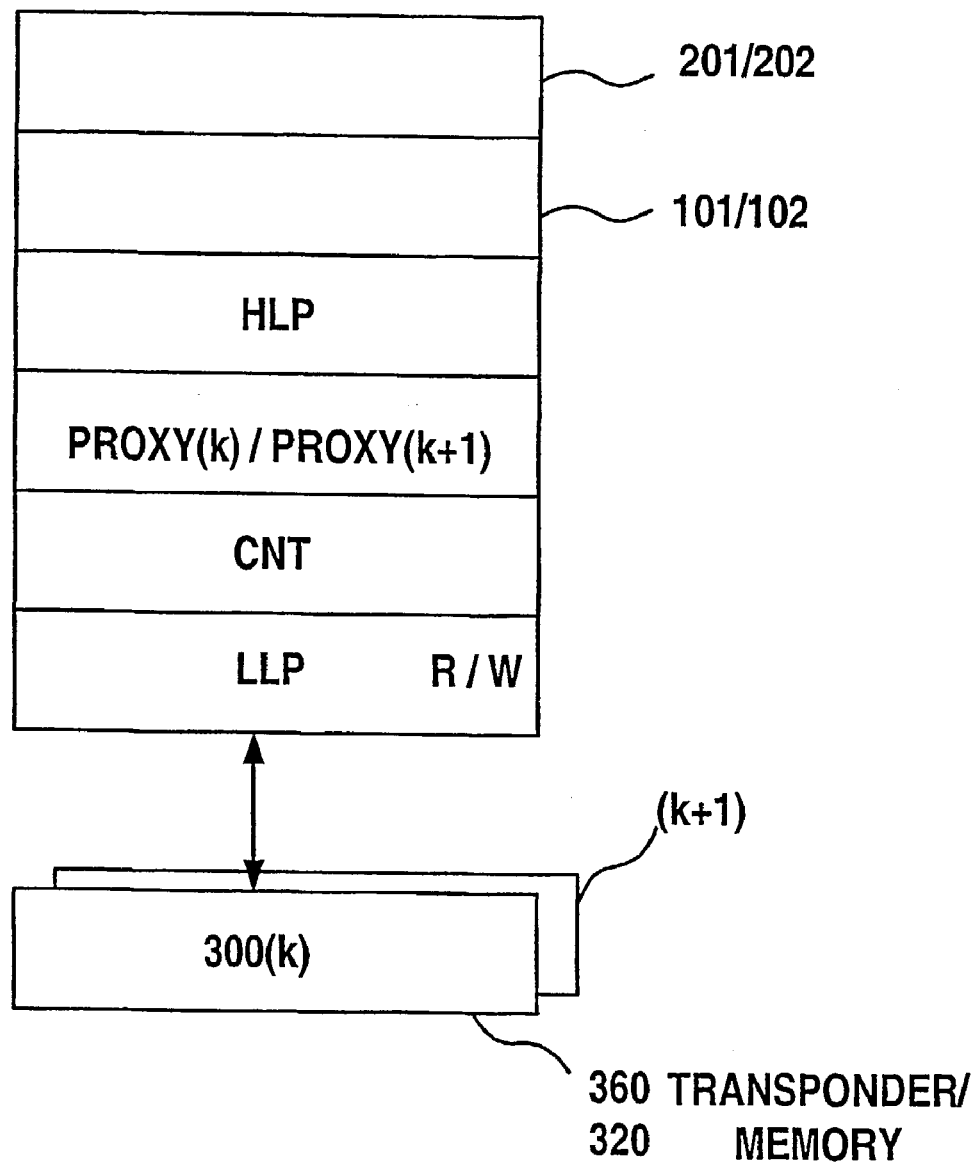
FIG. 11 illustrates a simplified block of application, computer program product, high-level protocol, first and second proxies, low level protocol, and controller for read/write communication with first and second transponder/memory tags.

FIG. 11 illustrates a simplified block of application 201/202, computer program product 101/102, high-level protocol HLP, first and second proxies (k) and (k+1), low level protocol (LLP) and controller (CNT)—so far software—for read/write communication with first (k) and second (k+1) tags 300 (hardware). Tags 300 have transponder 360 and memory 320 as described above. When performing read or write steps, the protocols and the controller provide proxy representation of each tag. In other words, the proxies are the software interfaces for communication between CPP and tag.

Figure 12:
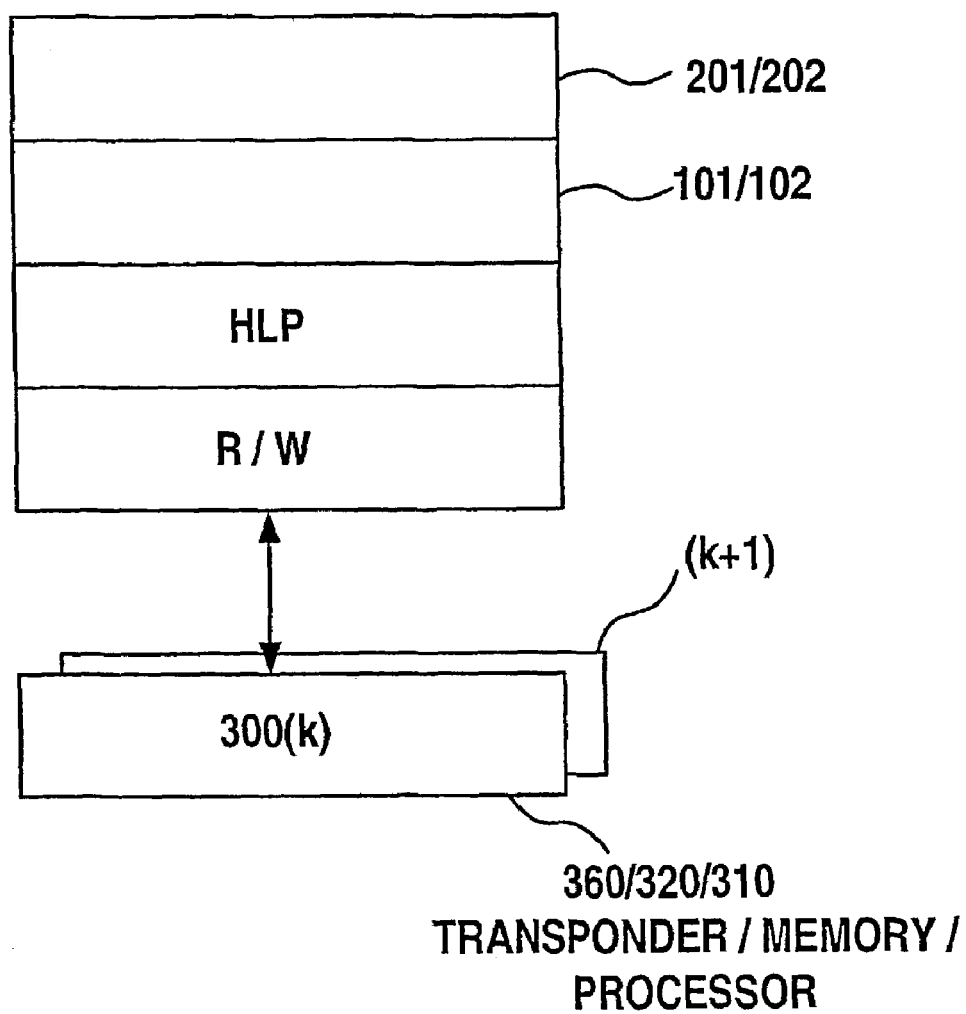
FIG. 12 illustrates a simplified block diagram of application, computer program product, high-level protocol, for read/write communication with first and second transponder/memory/processor tags.

FIG. 12 illustrates a simplified block diagram of application 201/202, computer program product 101/102, high-level protocol (HLP), for read/write communication with first (k) and second (k+1) tags 300 that have transponder 360, memory 320 as well as processor 310. Processor 310 allows to simplify the software.

As explained above, transportation system 90 carries objects 800 from location 10 to location 20. In case of errors, wrong-delivered objects are detected at the final location or at any intermediate computers in channel 50. Further, the origin of a wrong-delivered object can be determined and the objects can be redirected to the intended location.

Modifications are within the scope of the invention. For example, convenient updating and upgrading is achieved when application 201 optionally transmits new entries into table 105.

REFERENCE NUMBERS

* further embodiments
10 first location
100 CPP at exchange computer; CPP in general
101 CPP at first application computer
102 CPP at second application computer
105 assignment table
15 exit of first location
20 second location
201 first application at first location
202 second application at second location
25 entrance of second location
30 further location
300 tag
320 memory in tag
321 first memory portion
322 second memory portion
323 type-data (T)
324 content-data (C)
360 transponder in tag
40 further channel
50 transportation channel
501 first method, at first location
502 second method, at second location
510, 550 querying steps
520, 530 writing steps
540, 560 reading steps
60 transportation
800 object
800/300 object/tag combination
90 transportation system
900 exchange computer; computer in general
901 first application computer
902 second application computer
910 processor in general
920 memory in general
930 bus in general
940 input device in general
950 output device in general
960 user interface in general
970 carrier in general
980, 981, 982 signal in general
a, b; g, r bytes, byte values
C content-data
HLP, LLP, CNT high/low level protocol, controller
i−1, i, i+1 indices (past, present, future)

k, k+1 indices (proxy)
M meta-data
R, W reader, writer
T type-data

What is claimed is:

1. A system for tracking transportation of an object with an electronic tag from a first location to a second location, the system comprising:
   a memory for storing meta-data and associated type-data, wherein the type-data indicates length of the content-data required by the second location;
   an exchange computer capable of communicating with a first and second computer;
   the first computer associated with the first location for querying the exchange computer with meta-data associated with the object for type-data, writing the type-data to a first memory portion of the tag, and writing content-data to a second memory portion of the tag in a predefined format associated with the type-data;
   means for transporting the object with the tag from the first computer associated with the first location to a second computer associated with the second location; and
   the second computer at the second location reading the type-data from the first memory portion of the tag, querying the exchange computer with the type-data for meta-data, and reading content-data from the second memory portion of the tag in the predefined format associated with the type-data.

2. A system for tracking transportation of an object with an electronic tag from a first location to a second location, the system comprising:
   a memory for storing meta-data and associated type-data, wherein the type-data identifies type of the content-data required by the second location;
   an exchange computer capable of communicating with a first and second computer;
   the first computer associated with the first location for querying the exchange computer with meta-data associated with the object for type-data, writing the type-data to a first memory portion of the tag, and writing content-data to a second memory portion of the tag in a predefined format associated with the type-data;
   means for transporting the object with the tag from the first computer associated with the first location to a second computer associated with the second location; and
   the second computer at the second location reading the type-data from the first memory portion of the tag, querying the exchange computer with the type-data for meta-data, and reading content-data from the second memory portion of the tag in the predefined format associated with the type-data.

3. A method of tracking an object with an electronic tag from a first location to a second location, the method comprising:
   querying an exchange computer with meta-data associated with the object for type-data corresponding to the meta-data, wherein the type-data indicates length of the content-data required by the second location;
   writing the type-data to a first memory portion of the tag, wherein the type-data can be read from the first memory portion of the tag by a second computer associated with the second location and used to query the exchange computer for the meta-data by the second computer; and
   writing content-data to a second memory portion of the tag in a predefined format associated with the type-data.

4. The method of claim 3, wherein the amount of content-data written to the second memory portion of the tag depends on the type-data.

5. A method of tracking an object with an electronic tag from a first location to a second location, the method comprising:
   querying an exchange computer with meta-data associated with the object for type-data corresponding to the meta-data, wherein the type-data identifies type of the content-data required by the second location;
   writing the type-data to a first memory portion of the tag, wherein the type-data can be read from the first memory portion of the tag by a second computer associated with the second location and used to query the exchange computer for the meta-data by the second computer; and
   writing content-data to a second memory portion of the tag in a predefined format associated with the type-data.

6. The method of claim 5, wherein the amount of content-data written to the second memory portion of the tag depends on the type-data.

7. A method of tracking an object with an electronic tag from a first location to a second location, the method comprising:
   reading type-data from a first memory portion of the tag wherein the type-data has been received by a first computer associated with the first location from an exchange computer in response to a query with mete-data associated with the object and written to the first memory portion of the tag, and wherein the type-data identifies type of content-data required by the second location;
   querying the exchange computer with the type-data for the meta-data corresponding to the type-data; and
   reading the content-data from a second memory portion of the tag in a predefined format associated with the type-data.

8. An apparatus for tracking an object with an electronic tag from a first location to a second location, the apparatus comprising:
   means for querying an exchange computer with meta-data associated with the object for type-data corresponding to the meta-data;
   means for writing the type-data to a first memory portion of the tag, wherein the type-data can be read from the first memory portion of the tag by a second computer associated with the second location and used to query the exchange computer for the meta-data, and wherein the type-data identifies type of content-data required by the second location; and
   means for writing the content-data to a second memory portion of the tag in a predefined format associated with the type-data.

9. The apparatus of claim 8, wherein the type-data indicates length of the content-data required by the second location.

10. The apparatus of claim 8 wherein the amount of content-data written to the second memory portion of the tag depends on the type-data.

11. An apparatus for tracking an object with an electronic tag from a first location to a second location, the apparatus comprising:

means for reading type-data from a first memory portion of the tag wherein the type-data has been received by a first computer associated with the first location from an exchange computer in response to a query with meta-data associated with the object and written to the first memory portion of the tag, and wherein the type-data identifies type of content-data required by the second location;

means for querying the exchange computer with the type-data for the meta-data corresponding to the type-data; and means for reading content-data from a second memory portion of the tag, wherein the content data has been written to the second memory portion of the tag by the first computer in a predefined format associated with the type-data.

12. A computer program product for tracking an object with an electronic tag from a first location to a second location, the computer program product comprising a computer-usable medium having computer-readable code embodied thereon, the computer-readable code capable of causing a processor to execute the steps of:

querying an exchange computer with meta-data associated with the object for type-data corresponding to the meta-data, and wherein the type-data identifies type of content-data required by the second location;

writing the type-data to a first memory portion of the tag, wherein the type-data can be read from the first memory portion of the tag by a second computer associated with the second location and used to query the exchange computer for the meta-data by the second computer; and writing content-data to a second memory portion of the tag in a predefined format associated with the type-data.

13. A computer program for tracking an object with an electronic tag from a first location to a second location, the computer program product comprising a computer-usable medium having computer-readable code embodied thereon, the computer-readable code capable of causing a processor to execute the steps of:

reading type-data from a first memory portion of the tag wherein the type-data has been received by a first computer associated with the first location from an exchange computer in response to a query with meta-data associated with the object and written to the first memory portion of the tag, and wherein the type-data identifies type of content-data required by the second location;

querying the exchange computer with the type-data for the meta-data corresponding to the type-data; and reading content-data from a second memory portion of the tag, wherein the content data has been written to the second memory portion of the tag in a predefined format associated with the type-data by a first computer.

* * * * *